United States Patent [19]

Friedman

[11] Patent Number: 5,687,857
[45] Date of Patent: Nov. 18, 1997

[54] WALL MOUNTED HOLDER FOR ARTICLES

[76] Inventor: George Friedman, 5840 Shalom Street, Cote St. Luc, Quebec, Canada, HR2 2Z1

[21] Appl. No.: 514,143

[22] Filed: Aug. 11, 1995

[51] Int. Cl.$^6$ ...................................................... A47F 5/08
[52] U.S. Cl. ................... 211/89; 211/18; 211/19; 211/70.5
[58] Field of Search ................... 211/89, 87, 18, 211/19, 17, 20, 70.5, 70.8, 65; 248/312, 113

[56] References Cited

U.S. PATENT DOCUMENTS

| 599,645 | 2/1898 | Snyder | 211/19 |
|---|---|---|---|
| 764,774 | 7/1904 | Sargeant | 211/18 |
| 1,232,501 | 7/1917 | Colen | 211/17 X |
| 2,051,408 | 8/1936 | Karst | 211/87 X |
| 4,033,460 | 7/1977 | Alexandre | 211/70.5 |
| 4,391,376 | 7/1983 | Finnegan | 211/70.5 |
| 4,705,177 | 11/1987 | Oren | 211/70.5 |
| 4,798,298 | 1/1989 | Ursetta | 211/70.5 |
| 4,880,192 | 11/1989 | Vom Braucke et al. | 211/89 X |
| 4,909,467 | 3/1990 | Shan-Pao | 248/312 |
| 4,988,007 | 1/1991 | Chiarot | 211/70.5 |
| 5,078,276 | 1/1992 | Rogge et al. | 211/18 |
| 5,116,003 | 5/1992 | Gerhardt | 248/312 |
| 5,316,155 | 5/1994 | Collins et al. | 211/70.5 |
| 5,322,256 | 6/1994 | Kanwischer | 248/312 |
| 5,447,241 | 9/1995 | Bureau | 211/18 |

FOREIGN PATENT DOCUMENTS

| 0 180 884 | 10/1985 | European Pat. Off. . |
|---|---|---|
| 2036550 | 12/1970 | France . |
| 92733 | 2/1896 | Germany . |
| 459286 | 4/1928 | Germany . |
| 539918 | 11/1931 | Germany . |
| 3701902 | 10/1987 | Germany . |
| 4242005 | 6/1994 | Germany . |
| 211408 | 12/1940 | Switzerland . |
| 554156 | 9/1974 | Switzerland . |
| WO 95/03731 | 2/1995 | WIPO . |

Primary Examiner—Alvin C. Chin-Shue
Assistant Examiner—Sandra Snapp
Attorney, Agent, or Firm—Swabey Ogilvy Renault; James Anglehart

[57] ABSTRACT

The wall mounted holder has a two-piece base member with an inner back plate cooperating with the outer main base member to provide two halves of a pair of shaft receiving sleeves to facilitate assembly of the wall mounted holder. Using a three-piece construction, a bottom member having at least one pair of accessory hooks is provided and a middle extension member can be used as a bicycle tire guide to provide a wall mounted bicycle holder. While the base and bottom members can be made from durable injection molded pieces, the middle extension member has a uniform horizontal cross-section and can be made by extrusion.

14 Claims, 5 Drawing Sheets

5,687,857

WALL MOUNTED HOLDER FOR ARTICLES

FIELD OF THE INVENTION

The present invention relates to wall mounted holders for supporting vertically suspended articles.

BACKGROUND OF THE INVENTION

Wall mounted holders or hangers using pairs of opposed article gripping arms are known in the art from U.S. Pat. Nos. 4,909,467 (Shan-Pao) and 5,116,003 (Gerhardt). Such devices have gripping arms supported by a base for pivotal swinging movement about oppositely slanted axes to cause the gripping arms to converge into engagement with an article when swinging downward under the action of gravity. Such devices have been applied for hanging a variety of general objects such as bottles, tools, and in general, anything with a handle.

In the known prior art constructions, mounting of the gripping arms in their base has either involved applying retaining clips to base ends of the gripping arms once inserted in the sleeves of the base member, or stamping the base ends once inside the sleeves in order to provide retaining protrusions on the base ends of the gripping arms to retain the gripping arms in the sleeves.

Also in the known prior art, the wall mounted holder had, as its primary function, supporting robust objects that could not otherwise be easily hung from a simple hook, making it necessary to provide an entire such wall mounted holder for each article to be held, no matter how small or large.

Furthermore, the prior art wall mounted holders do not provide an easy way to support a bicycle.

SUMMARY OF THE INVENTION

It is an object of the present invention to provide a wall mounted holder of the above-mentioned type having a pair of opposed gripping arms having an improved and simplified assembly in which the base comprises an outer member and an inner member which, when assembled, provide a pair of shaft receiving sleeves and when disassembled, allow for the base portions of the gripping arms to be inserted without needing to apply retaining clips after assembly.

It is another object of the present invention to provide a wall mounted holder for hanging a bicycle.

It is furthermore an object of the invention to provide a wall mounted holder having gripping arms for supporting a primary object, and at least one pair of lateral hooks for supporting accessories associated with the primary object and of a type easily attached to a hook.

It is yet another object of the present invention to provide an elongated wall mounted holder of the above mentioned type having a pair of gripping arms which provides a simple yet sturdy construction, assembly and mounting to the wall.

According to the invention, there is provided a wall mounted holder for an article comprising: a base member comprising an outer member and an inner member, the latter two members each defining one half of a pair of shaft receiving sleeves, whereby when the two members are disassembled shafts can be inserted, and when the two members are assembled shafts can be secured in the sleeves; a pair of gripping arms comprising suitably shaped gripping ends and base ends mounted in the sleeves, the base ends having a shaft portion and retaining means for preventing removal of the shaft portion from the sleeves, the arms swinging about respective axes oppositely inclined relative to one another and to a horizontal direction, whereby the gripping ends separate when lifted to receive the article, and come together when lowered to grip the article, the article being securely held in the arms as a result of gravity; and means for fastening at least the outer member to a wall support and for securely holding the outer and inner members together. As can be appreciated, when the outer member is fastened to the wall support, the inner member is securely retained in place and separation of the outer member and inner member from one another under the action of force on the gripping arms is prevented.

According to the invention, there is also provided a wall mounted holder for a bicycle comprising: a base member including a pair of shaft receiving sleeves; a pair of gripping arms comprising suitably shaped gripping ends for gripping a bicycle tire and base ends mounted in the sleeves, the base ends having a shaft portion and retaining means for preventing removal of the shaft portion from the sleeves, the arms swinging about respective axes oppositely inclined relative to one another and to a horizontal direction, whereby the gripping ends separate when lifted to receive a tire of the bicycle, and come together when lowered to grip the tire, the tire being securely held in the arms as a result of gravity; a downwardly extending, wall engaging, vertically disposed, tire guide member connected to the base member for receiving the tire before engagement with the arms and guiding the tire upwardly as the arms separate and embrace the tire; and means for fastening the base member to a wall support. As can be appreciated, the tire guide member facilitates the alignment of the front tire or rear tire of a bicycle with the gripping arms as it is being lifted to engage the same.

Furthermore, the invention provides a wall mounted holder for skis comprising: a base member including a pair of shaft receiving sleeves; a pair of gripping arms comprising suitably shaped gripping ends for gripping at least one ski and base ends mounted in the sleeves, the arms being arranged such that the gripping ends are substantially parallel when engaging opposite sides of the at least one ski, the base ends having a shaft portion and retaining means for preventing removal of the shaft portion from the sleeves, the arms swinging about respective axes oppositely inclined relative to one another and to a horizontal direction, whereby the gripping ends separate when lifted to receive the at least one ski, and come together when lowered to grip the at least one ski, the at least one ski being securely held in the arms as a result of gravity; at least one pair of lateral hook members for hanging ski accessories on each side of the gripping arms, the hook members being connected to the base member; and means for fastening the base member to a wall support. As can be appreciated, ski accessories, such as poles and goggles, can be hung along with the skis from the same wall mounted holder.

The invention thus also provides an elongate wall mounted holder for an article comprising: a base member including a pair of shaft receiving sleeves, and a bottom socket-plug connector means; a pair of gripping arms comprising suitably shaped gripping ends and base ends mounted in the sleeves, the base ends having a shaft portion and retaining means for preventing removal of the shaft portion from the sleeves, the arms swinging about respective axes oppositely inclined relative to one another and to a horizontal direction, whereby the gripping ends separate when lifted to receive the article, and come together when lowered to grip the article, the article being securely held in the arms as a result of gravity; a middle extension member of uniform horizontal cross-section fitting into the bottom connector means; a bottom member having an upper socket-plug connector means connected to a bottom of the middle extension member; and means for fastening the base member, the middle extension member and the bottom member to a wall support. As can be appreciated, the substantially three-piece wall mounted construction is simple, solid and durable. Preferably, the base member and bottom member are each made from at least one injection molded plastic part while the middle extension member is made by extrusion.

BRIEF DESCRIPTION OF THE DRAWINGS

The invention will be better understood by way of the following detailed description of a preferred embodiment of the invention with reference to the appended drawing in which.

DETAILED DESCRIPTION OF THE PREFERRED EMBODIMENT

Figure 1:
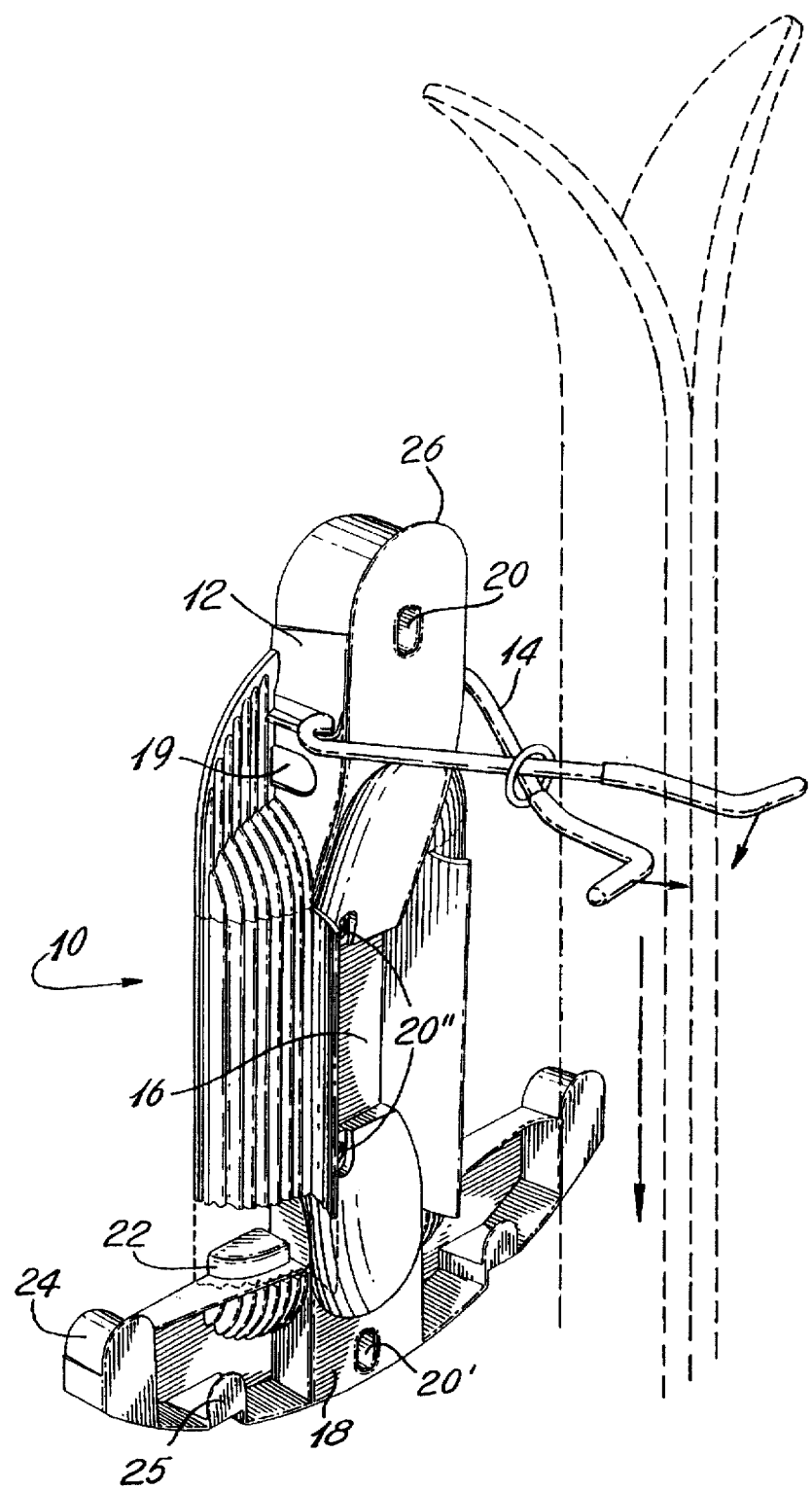
FIG. 1 shows a perspective view of the preferred embodiment with gripping arms for skis and a short extruded middle extension member.
Figure 2:
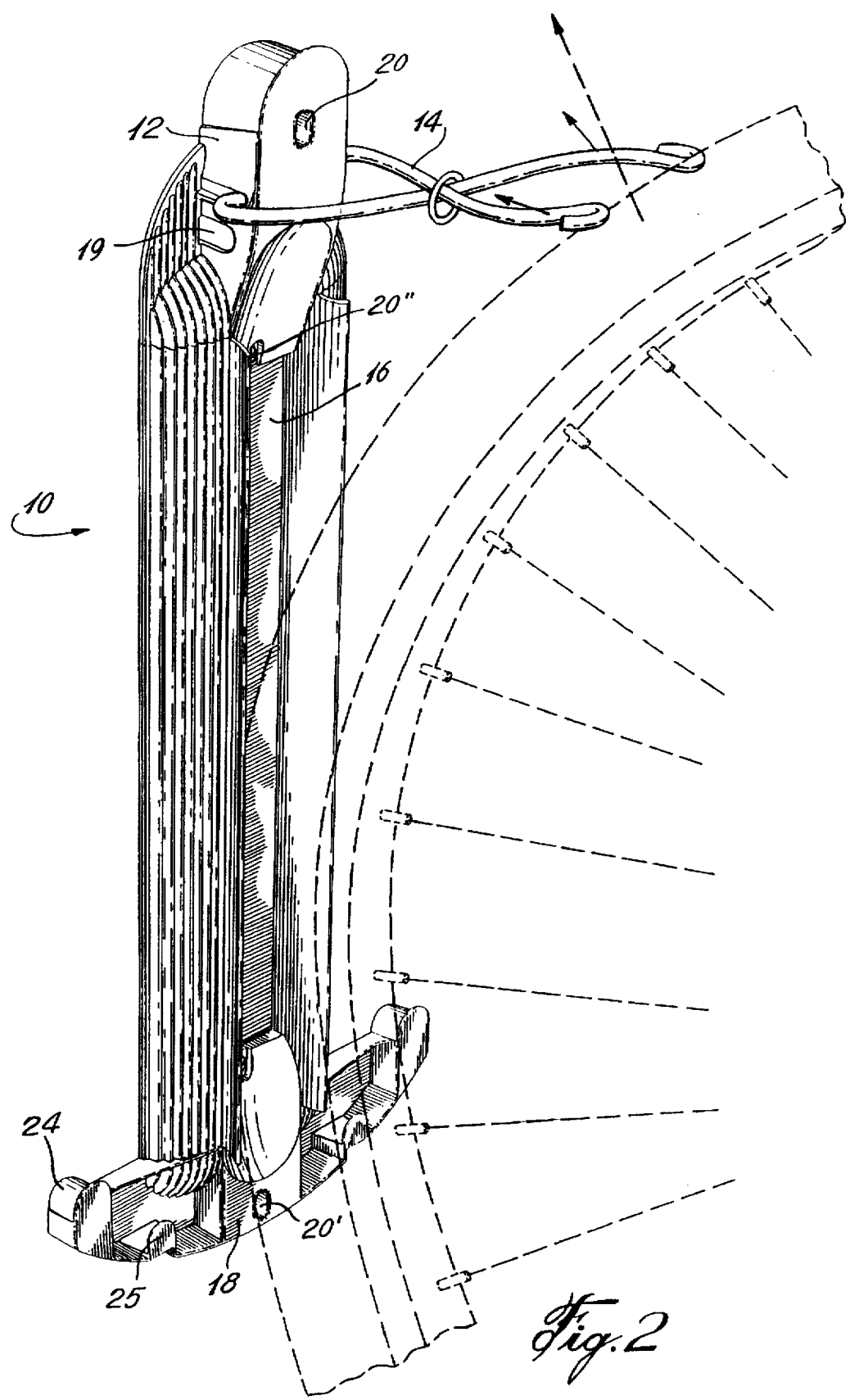
FIG. 2 is a perspective view of the preferred embodiment having gripping arms for a bicycle tire and a longer middle extension member for receiving a bicycle tire.

As illustrated in FIGS. 1 and 2, the wall mounted holder 10 according to the preferred embodiment is made of three basic components, namely, a base member 12, gripping arms 14, a middle extension member 16, and a bottom member 18. The base member is made of injected molded plastic, as is the bottom member 18, while the extension member 16 is made by extrusion. The base member and the bottom member are provided with a plug and socket means 22 for plugging into the middle extension member. Screw fastening holes 20 and 20' allow the base member and bottom members to be screw mounted onto a wall support (as illustrated in FIG. 4).

As illustrated in FIG. 1, the gripping arms may be formed to substantially flatly grip the outer sides of a pair of skis. In this case, the gripping arms are provided with a non-slip coating as is known in the art. As shown in FIG. 2, the gripping arms are curved to better grip around a bicycle tire. A non-slip coating on the arms 14 for the bicycle holder is optional. As shown in FIG. 2, the middle extension member 16, in the case of the bicycle rack, is made long enough to receive and guide the bicycle tire as it is moved upwards to engage and lift arms 14. The bottom member 18 is provided with a first pair of hook members 24 as well as a second pair of hook members 25 for hanging related accessories, such as ski poles, goggles, bicycle or ski helmets or the like. An upper circular ridge 26 provides a suitable hook for the strap of a larger bag such as a ski boot bag. For locking the supported article, holes 19 are provided in each side of base member 12 so that a chain or cable of a lock may be passed through and then used to lock the bicycle to the holder 10.

Figure 3:
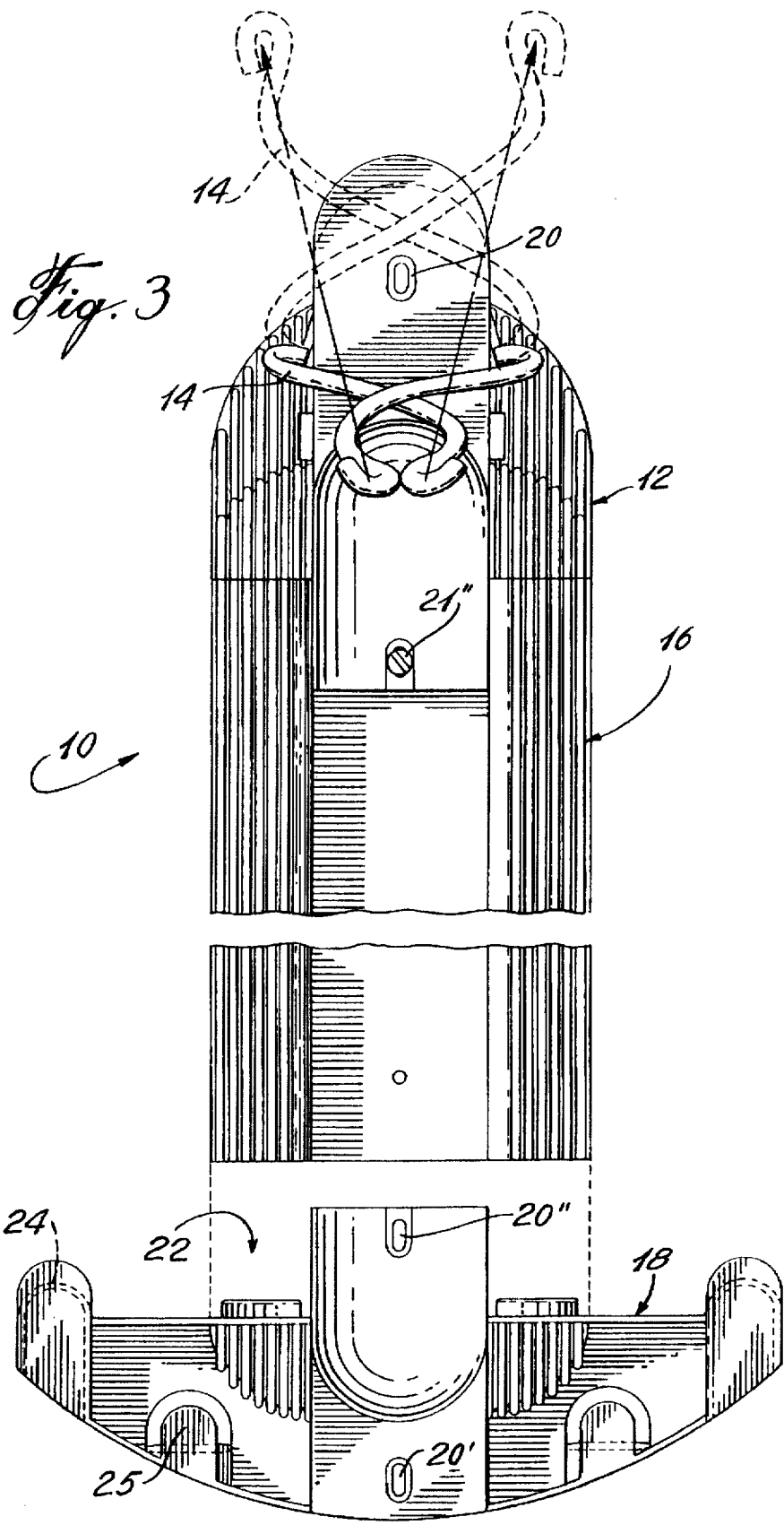
FIG. 3 is a front view of the preferred embodiment illustrating the movement of the gripping arms and illustrating the bottom member before assembly.
Figure 4:
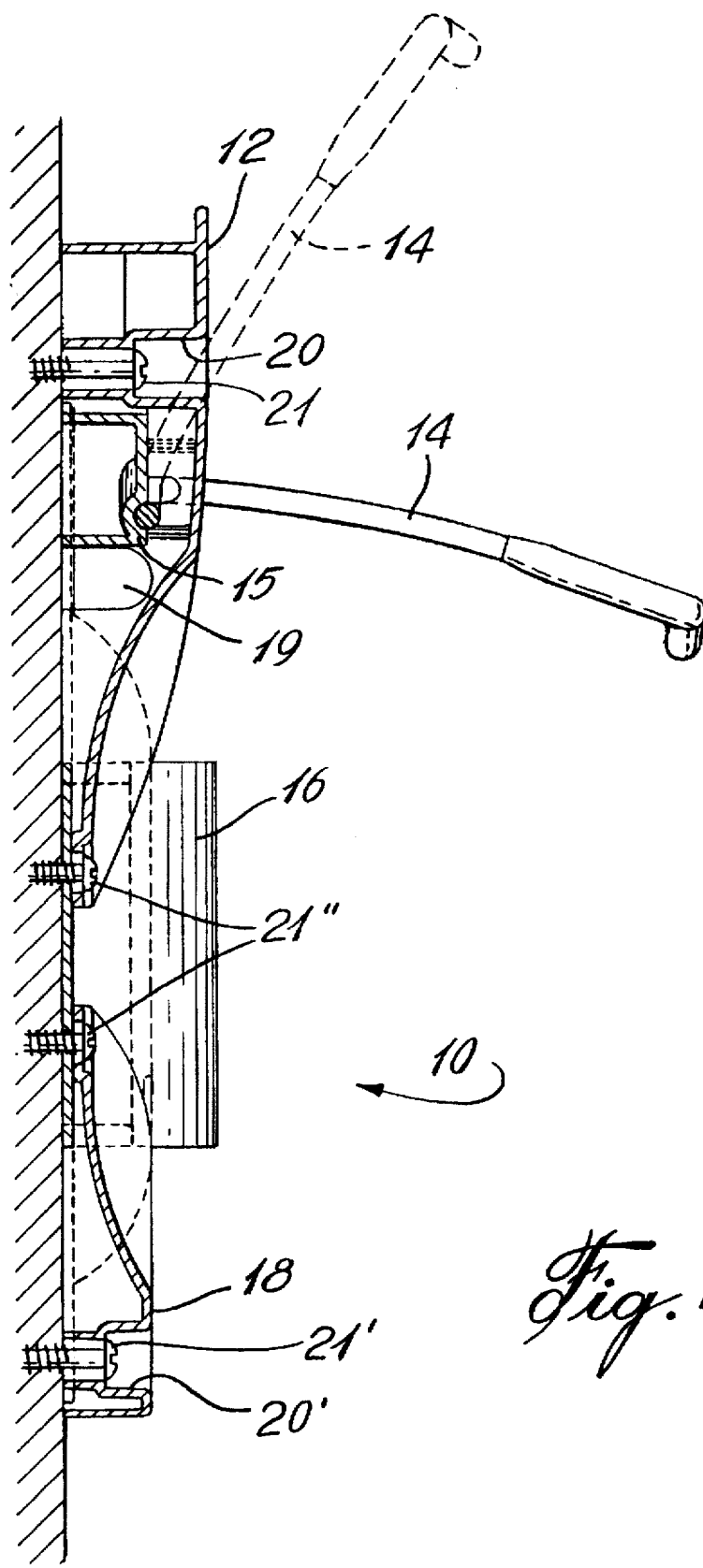
FIG. 4 is a vertical side sectional view illustrating the wall mounted holder mounted to a wall support and illustrating the inner member of the base member being supported by the wall support and providing, with the outer member of the base member, a shaft receiving sleeve.

As illustrated in FIGS. 3 and 4, the holder 10 is connected together by screws 21" inserted into holes 20". The screws 21" are short screws which pass through the holes 20" in the bottom of the base member and at the top projection of the bottom member 18 and connect into small holes in the middle extension member 16. The interlocking plug-in socket connection solidly connects the members 12, 16 and 18 together with the screws 21" preventing disconnection. Through the holes 20 and 20', screws 21 and 21' are provided for mounting the base and bottom members securely to a wall support.

As can be appreciated, the middle extension member 16 has a trough and side walls which are curved outwardly for facilitating the insertion and guiding of a bicycle tire. The length of the middle extension member 16 can be chosen such that when a large bicycle tire enters the trough of member 16 from the bottom member 18 at its inwardly curved entrance portion, the gripping arms 14 begin to be engaged. As a result of further motion up towards the inwardly curved bottom portion of member 12 forming the upper extremity of the channel or trough within member 16, the gripping arms 14 are lifted sufficiently to separate to fall around the bicycle tire of a maximum standard width. Once the gripping arms have fallen around the bicycle tire, the bicycle may be lowered with the gripping arms holding tightly around the tire and thus allowing the bicycle to hang from the gripping arms. To remove the bicycle from the gripping arms, it is lifted sufficiently that the gripping arms lift and separate while the tire is pulled away from the gripping arms and lowered to the ground.

Figure 5:
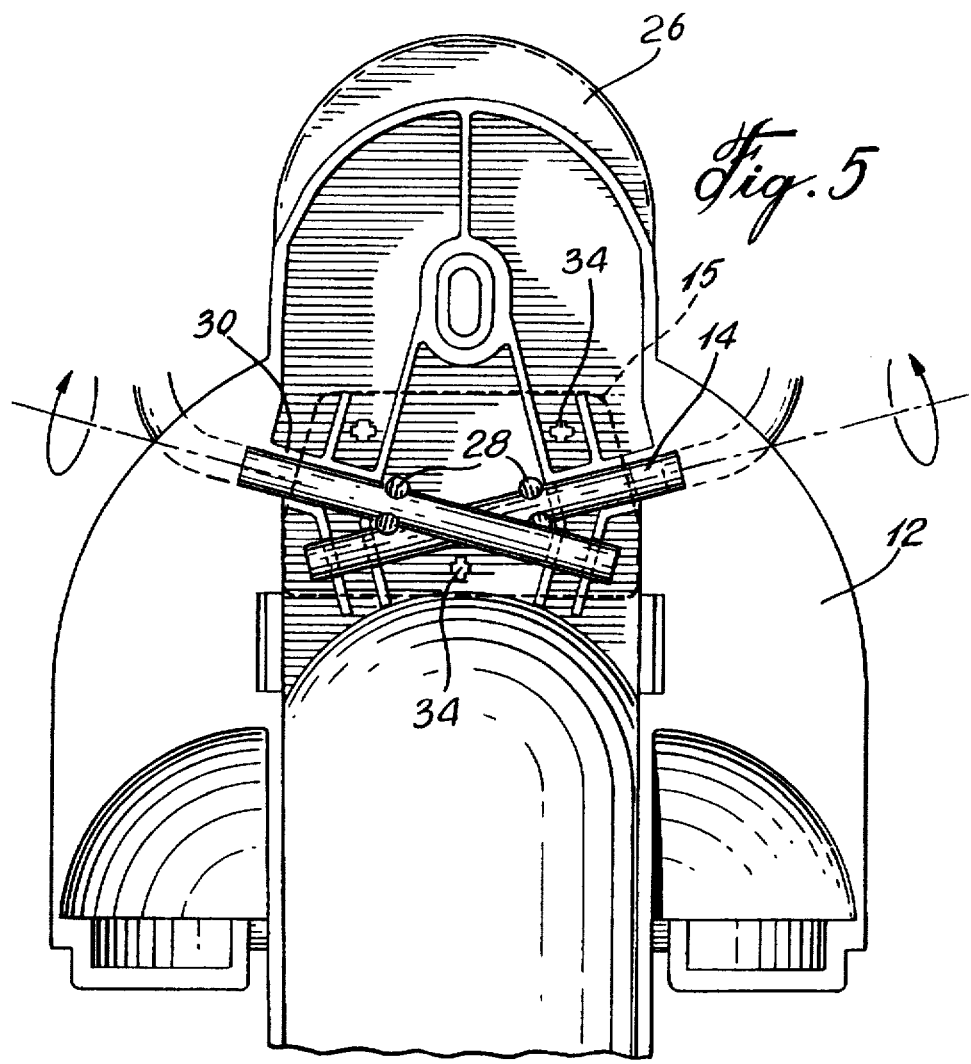
FIG. 5 illustrates the pair of shaft portions at the base ends of the gripping arms as inserted into the outer member of the base member.
Figure 6:
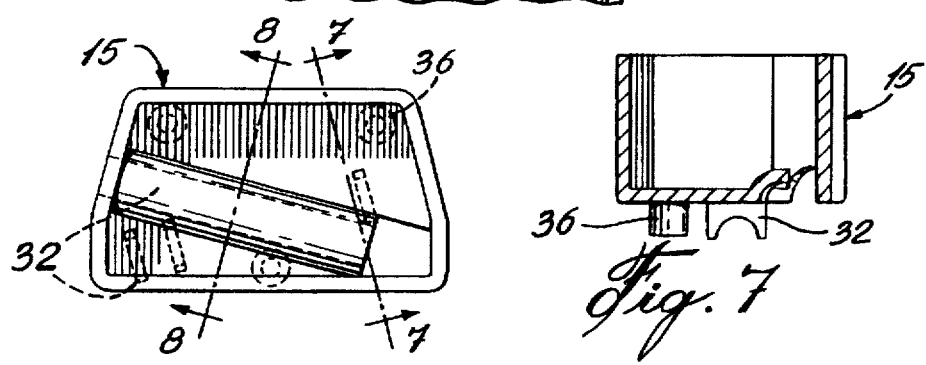
FIG. 6 illustrates the outer member of the base member showing the complementary halves of the pair of shaft receiving sleeves as well as the complementary pin receiving seats for fastening the inner member to the outer member/and FIGS. 7 and 8 are cross-sectional views of the inner member illustrating details of the shaft receiving sleeve halves.
Figure 7:
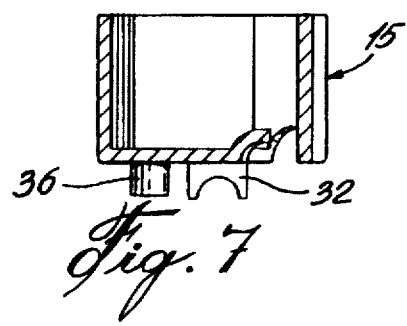
Figure 8:
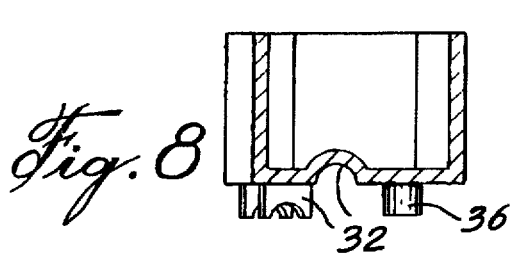

As can be seen from FIG. 4, the inner member 15 cooperates with the outer part of the base member 12 to provide the shaft receiving sleeves for the shaft portion of the base and of the gripping arm 14. The inner member 15 is a back plate which abuts against the wall support to which holder 10 is mounted. As illustrated in FIG. 5, the shaft portions of the gripping arms 14 are provided with stamped retaining protrusions 28 and are placed in a crossed fashion one above the other in outer halves of shaft retaining sleeves. The inner halves of the shaft retaining sleeves are provided by member 15 when placed over the sleeve halves 30. As shown, a set of three pins 34 made with three pin receiving holes 36 of the member 15 illustrated in FIGS. 6, 7 and 8, and as the member 15 is pressed over the back of the base member 12, the pins 34 and holes 36 engage and frictionally lock members 12 and 15 together with the sleeve halves 30 and 32 enclosing the gripping arms 14.

As can be appreciated, the two-piece snap-together construction for the base member 12 simplifies manufacture by allowing the shaft retainer clips or stamped protrusions 28 to be applied prior to assembly, yet the inner member 15 is prevented from separating from the outer member 12 since the outer member is mounted to the wall and the inner member 15 is sandwiched between the outer member and the wall.

While the invention has been described above with respect to a three-piece bicycle or ski holder, it may be applied to any wall mounted holder having a base member and a pair of gripping arms. As is known in the art, such base members may be individually mounted to a wall or may be made to be inserted into a track or rail, the track or rail being mounted to a wall and the track or rail providing the wall support for the base member.

I claim:

1. A wall mounted holder for an article comprising:

a base member comprising an outer member and an inner member, said latter two members each defining one half of a pair of shaft receiving sleeves, whereby when said two members are disassembled shafts can be inserted, and when said two members are assembled shafts can be secured in said sleeves;

a pair of gripping arms comprising suitably shaped gripping ends and base ends mounted in said sleeves, said base ends having a shaft portion and retaining means for preventing removal of said shaft portion from said sleeves, said arms swinging about respective axes oppositely inclined relative to one another and to a horizontal direction, whereby said gripping ends separate when lifted to receive the article, and come together when lowered to grip the article, the article being securely held in said arms as a result of gravity; and means for fastening at lease wall outer member to a wall support and for securely holding said outer and inner members together.

2. A wall mounted holder for a bicycle comprising:

a base member including a pair of shaft receiving sleeves;

a pair of gripping arms comprising suitably shaped gripping ends for gripping a bicycle tire and base ends mounted in said sleeves, said base ends having a shaft portion and retaining means for preventing removal of said shaft portion from said sleeves, said arms swinging about respective axes oppositely inclined relative to one another and to a horizontal direction, whereby said gripping ends separate when lifted to receive a tire of the bicycle, and come together when lowered to grip the tire, the tire being securely held in said arms as a result of gravity;

a downwardly extending, wall engaging, vertically disposed, tire guide member connected to said base member for receiving the tire before engagement with said arms and guiding the tire upwardly as said arms separate and embrace the tire; and means for fastening said base member to a wall support.

3. The holder as claimed in claim 1, wherein said inner member is flush with said outer member on a wall side thereof, whereby said inner member abuts said wall support when said outer member is fastened thereto.

4. An elongate wall mounted holder for an article comprising:

a base member including a pair of shaft receiving sleeves, and a bottom socket-plug connector means;

a pair of gripping arms comprising suitably shaped gripping ends and base ends mounted in said sleeves, said base ends having a shaft portion and retaining means for preventing removal of said shaft portion from said sleeves, said arms swinging about respective axes oppositely inclined relative to one another and to a horizontal direction, whereby said gripping ends separate when lifted to receive the article, and come together when lowered to grip the article, the article being securely held in said arms as a result of gravity;

a middle extension member of uniform horizontal cross-section fitting into said bottom connector means;

a bottom member having an upper socket-plug connector means connected to a bottom of said middle extension member; and means for fastening said base member, said middle extension member and said bottom member to a wall support.

5. The holder as claimed in claim 4, wherein said base member and said bottom member are each made from at least one injection molded plastic part, and said middle extension member is made by extrusion.

6. The holder as claimed in claim 1, wherein said outer member and said inner member are provided with complementary press-fit engagement means for fastening said inner member to said outer member.

7. The holder as claimed in claim 1, wherein said shaft receiving sleeves are disposed at least in part one above the other.

8. The holder as claimed in claim 2, wherein said tire guide member comprises a pair of side walls defining a trough.

9. The holder as claimed in claim 8, wherein said side walls are outwardly curved.

10. The holder as claimed in claim 2, wherein a through hole is provided in said base member for passing a bicycle lock for locking the bicycle to the base member.

11. The holder as claimed in claim 2, wherein a bottom member is secured to a bottom of the tire guide member, said bottom member being fastened to said wall support.

12. A wall mounted holder for skis comprising: p1 a base member including a pair of shaft receiving sleeves, said member being provided with a rounded top surface and an outer arcuate upwardly projecting lip to form a hook for a strap;

a pair of gripping arms comprising suitably shaped gripping ends for gripping at least one ski and base ends mounted in said sleeves, said arms being arranged such that said gripping ends are substantially parallel when engaging opposite sides of said at least one ski, said base ends having a shaft portion and retaining means for preventing removal of said shaft portion from said sleeves, said arms swinging about respective axes oppositely inclined relative to one another and to a horizontal direction, whereby said gripping ends separate when lifted to receive said at least one ski, and come together when lowered to grip said at least one ski, said at least one ski being securely held in said arms as a result of gravity;

at least one pair of lateral hook members for hanging ski accessories on each side of said gripping arms, said hook members being connected to said base member; and means for fastening said base member to a wall support.

13. The holder as claimed in claim 12, wherein said base member is provided with a downwardly extending wall engaging vertically disposed member having a laterally outward extending bottom portion on which said at least one pair of lateral hook members are provided.

14. The holder as claimed in claim 13, wherein two pairs of said lateral hook members are provided.

\* \* \* \* \*